United States Patent
Saito et al.

(10) Patent No.: US 7,844,893 B2
(45) Date of Patent: Nov. 30, 2010

(54) DOCUMENT EDITING METHOD, DOCUMENT EDITING DEVICE, AND STORAGE MEDIUM

(75) Inventors: Teruka Saito, Ashigarakami-gun (JP); Toshiya Koyama, Ashigarakami-gun (JP); Masakazu Tateno, Ashigarakami-gun (JP); Takashi Nagao, Ashigarakami-gun (JP); Masayoshi Sakakibara, Ebina (JP); Kei Tanaka, Ashigarakami-gun (JP); Kotaro Nakamura, Minato-ku (JP); Xinyu Peng, Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1028 days.

(21) Appl. No.: 11/210,898

(22) Filed: Aug. 25, 2005

(65) Prior Publication Data
US 2006/0218484 A1 Sep. 28, 2006

(30) Foreign Application Priority Data
Mar. 25, 2005 (JP) ............................. 2005-090201

(51) Int. Cl.
*G06F 17/00* (2006.01)
(52) U.S. Cl. ........................ 715/231; 715/268
(58) Field of Classification Search ............... 715/200, 715/255, 230–233, 268
See application file for complete search history.

(56) References Cited

U.S. PATENT DOCUMENTS

| 5,570,435 | A | * | 10/1996 | Bloomberg et al. | 382/283 |
|---|---|---|---|---|---|
| 5,666,139 | A | * | 9/1997 | Thielens et al. | 345/173 |
| 5,813,018 | A | * | 9/1998 | Kaji et al. | 715/236 |
| 6,012,073 | A | * | 1/2000 | Arend et al. | 715/236 |
| 6,985,252 | B1 | * | 1/2006 | Kubo | 358/1.9 |
| 7,143,344 | B2 | * | 11/2006 | Parker et al. | 715/236 |
| 7,263,655 | B1 | * | 8/2007 | Carden, Jr. | 715/234 |
| 7,296,228 | B2 | * | 11/2007 | Bera | 1/1 |
| 7,519,901 | B2 | * | 4/2009 | Price et al. | 715/233 |
| 7,730,391 | B2 | * | 6/2010 | Madam | 715/233 |
| 2001/0032070 | A1 | * | 10/2001 | Teicher | 704/2 |
| 2002/0009318 | A1 | * | 1/2002 | Maie | 400/109.1 |
| 2002/0029146 | A1 | * | 3/2002 | Nir | 704/260 |
| 2002/0078088 | A1 | * | 6/2002 | Kuruoglu et al. | 707/512 |

(Continued)

FOREIGN PATENT DOCUMENTS

JP 03-164975 7/1991

(Continued)

OTHER PUBLICATIONS

Mitamura et al., An Efficient Interlingua Translation System for Multi-Lingual Document Production, Google Jul. 1991, pp. 55-61.*

(Continued)

*Primary Examiner*—Cong-Lac Huynh
(74) *Attorney, Agent, or Firm*—Oliff & Berridge, PLC (57) ABSTRACT

A document editing device has a editing unit and a supplementary information editing unit. The editing unit edits a manuscript element of a document. The supplementary information editing unit edits the supplementary information of the document based on a result of editing the manuscript element by the editing unit. The document is a electronic document read by a reading device.

19 Claims, 4 Drawing Sheets

U.S. PATENT DOCUMENTS

| | | | |
|---|---|---|---|
| 2004/0046742 A1* | 3/2004 | Johnson | 345/168 |
| 2004/0217887 A1* | 11/2004 | Nomizu et al. | 341/50 |
| 2005/0028087 A1* | 2/2005 | Barrie et al. | 715/513 |
| 2005/0183005 A1* | 8/2005 | Denoue et al. | 715/512 |
| 2005/0197825 A1* | 9/2005 | Hagerman et al. | 704/2 |
| 2005/0251743 A1* | 11/2005 | Ishikawa et al. | 715/532 |
| 2006/0077411 A1* | 4/2006 | Mathieson et al. | 358/1.13 |
| 2006/0200766 A1* | 9/2006 | Lakritz | 715/536 |
| 2006/0206304 A1* | 9/2006 | Liu | 704/2 |
| 2006/0217955 A1* | 9/2006 | Nagao et al. | 704/2 |
| 2006/0217956 A1* | 9/2006 | Nagao et al. | 704/2 |
| 2006/0218495 A1* | 9/2006 | Onda et al. | 715/540 |
| 2006/0245005 A1* | 11/2006 | Hall et al. | 358/448 |
| 2008/0040664 A1* | 2/2008 | Bera | 715/272 |
| 2009/0296124 A1* | 12/2009 | Ohguro | 358/1.9 |

FOREIGN PATENT DOCUMENTS

| | | |
|---|---|---|
| JP | A 7-282062 | 10/1995 |
| JP | A 7-295970 | 11/1995 |
| JP | 2000-123012 | 4/2000 |
| JP | A 2000-163414 | 6/2000 |

OTHER PUBLICATIONS

Jun. 22, 2010 Office Action issued in Japanese patent application No. 2005-090201 (with translation).

* cited by examiner

| NUMBER | TYPE | LOCATION | SIZE | OBJECT INFORMATION | DEPENDENCY RELATIONSHIP |
|---|---|---|---|---|---|
| 1 | SURROUNDING LINE | (400, 100) | 60×40 | Circular | NONE |
| 2 | UNDERLINE | (100, 200) | 150×7 | 「Car Navigation Systems」 | NONE |
| 3 | STRIKETHROUGH LINE | (150, 300) | 10×15 | 「c」 | NONE |
| 4 | LEADER LINE | (150, 400) | 200×40 | 「Restoration」 | PARENT (#5) |
| 5 | NOTE | (380, 410) | 40×15 | NONE | CHILD (#4) |
| 6 | STICKY TAG | (400, 300) | 80×30 | 「Chapter 1」 | NONE |
| ... | ... | ... | ... | ... | ... |

| TYPE | RULE (POSITION) | RULE (SIZE) |
|---|---|---|
| SURROUNDING LINE | DEPENDING ON THE CHARACTER | DEPENDING ON THE CHARACTER |
| TYPE | DEPENDING ON THE CHARACTER | DEPENDING ON THE CHARACTER |
| STRIKETHROUGH LINE | SUPPLEMENTARY INFORMATION NOT CONSIDERED | SUPPLEMENTARY INFORMATION NOT CONSIDERED |
| LEADER LINE | THE CHARACTER AND END OF THE ARROW IS CHANGED ACCORDINGLY | ADJUST IN ACCORDANCE WITH DEPENDENCY RELATIONSHIP (MAINTAIN RELATIVE POSITION) |
| STICKY TAG | DEPENDING ON THE CHARACTER | CHANGE UNNECESSARY |
| NOTE | CONSIDER ORIGINAL LOCATION | CONSIDER ORIGINAL LOCATION |
| HEADER / FOOTER | CHANGE UNNECESSARY | CHANGE UNNECESSARY |
| ⋮ | ⋮ | ⋮ |

ディジタル画像は今日、ウェブ、 DVD、カーナビゲーションシステムなど私たちの身の周りにあふれています。この報告書では、コンピュータによるディジタル画像の生成および操作について説明します。

第一章:画像処理手法

画像処理操作は大まかに3つの大　きなカテゴリーに分けられます。それは、画像圧縮、画像強調・復元、測定抽出の3つです。‥‥

調査する

DOCUMENT EDITING METHOD, DOCUMENT EDITING DEVICE, AND STORAGE MEDIUM

BACKGROUND OF THE INVENTION

1. Field of the Invention

The present invention relates to techniques for editing electronic documents, and particularly relates to techniques for editing supplementary information attached to manuscript data.

2. Description of the Related Art

Conversion of paper documents to electronic documents using a scanner, character recognition processing on these electronic documents in order to carry out various types of editing, such as machine translation or layout changes (formatting changes), using personal computers and the like is performed daily. However, documents often have a line drawn under a certain part, or a note written in blank spaces (see FIG. 1, for example). Such information, which is not part of the manuscript portion, is referred to below as "supplementary information". If supplementary information is included in the electronic document, the manuscript portion (manuscript data) is extracted and translated so that a position of the manuscript portion is changed because of difference in language. Thus, correlation between the translated manuscript data and the supplementary information that is attached to the original data is also changed.

Therefore, it is necessary to appropriately change the position of the supplementary information in accordance with the changed position of the manuscript. In JP H7-282062A, a technique is disclosed for attaching an underline, in units of clauses, to the electronic document, and then attaching an underline to the equivalent phrase after translation. For documents to which supplementary information is attributed, JP H7-295970A discloses a technique for storing the position relationship of each document element of a manuscript before and after editing, and for attaching the supplementary information to the manuscript after editing, based on this position relationship. JP 2000-163414A discloses a technique for storing the position arrangement of supplementary information in association with the document elements in the vicinity of the position in which the supplementary information is arranged when attaching the supplementary information to the electronic document, and for changing the position arrangement of the supplementary information based on that correlation when there is a change in the content of the electronic document.

Nevertheless, the technology disclosed in JP H7-282062A is only capable of drawing underlines in units of clauses, and cannot handle a multitude of types of and methods for arranging the supplementary information, such as leader lines drawn between lines on the manuscript, or notes written in blank spaces of the manuscript. Furthermore, the technology disclosed in JP H7-295970A and JP 2000-163414A is able to change the position of supplementary information in accordance with movements after processing to document elements, but cannot change the size of the supplementary information (such as font size of notes and length of underlines). Even if, for example, the size of the characters before and after translation is maintained, generally, the length of corresponding words (phrases) differs between languages, and so if the size of the supplementary information (for example, the length of an underline) remains the same, then an offset will be created in the correlation between the document element and the supplementary information attributed to that document element.

SUMMARY OF THE INVENTION

The present invention has been made in view of the above circumstances, and provides a document editing device capable of appropriately editing supplementary information, even if the position or size of manuscript elements has changed as a result of the manuscript being edited.

In order to address these issues, the present invention provides a document editing method, the method including: a editing unit that edits an manuscript element of a document; and a supplementary information editing unit that edits the supplementary information of the document based on a result of editing the manuscript element by the editing unit, wherein the document is a electronic document read by a reading device.

BRIEF DESCRIPTION OF THE DRAWINGS

Embodiments of the present invention will be described in detail based on the following figures, wherein.

DETAILED DESCRIPTION OF THE INVENTION

Embodiment

Embodiments of the present invention are described below with reference to the drawings. It should be noted that the "document" described below is configured from a manuscript portion that is constituted by at least one of a character, a letter, a picture, a illustration, for example, and supplementary information such as an underline, a line, a strikethrough line, an arrow, a note, an annotation and a tag provided on the manuscript portion. Furthermore, "document data" refers to digital image data that is obtained by electronically reading in documents with a scanner, or the like.

Figure 2:
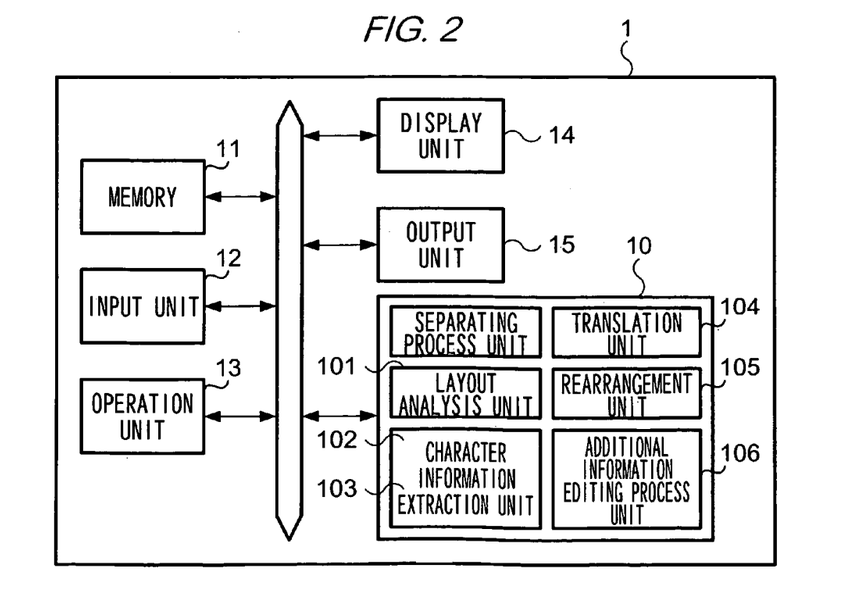
FIG. 2 is a block diagram expressing a functional configuration of a document editing device 1 according to an exemplary embodiment of the present invention.

FIG. 2 is a view expressing a functional configuration of a document editing device 1 according to one embodiment of the present invention. As shown in FIG. 2, the document editing device 1 has a control unit 10, a memory 11, an input unit 12, an operation unit 13, a display unit 14 and an output unit 15. The control unit 10 is provided by a control processor such as a CPU, and this controls the various parts of the document editing device 1. Moreover, the control unit 10 has a separating process unit 101, a layout analysis unit 102, a character information extraction unit 103, a translation unit 104, a rearrangement unit 105 and a supplementary information editing process unit 106. The separating process unit 101 carries out a process to separate the document data into data corresponding to the manuscript portion (manuscript data), and data other than the manuscript portion, such as underlines and notes (supplementary data). The layout analysis unit 102 performs predetermined analysis of the manuscript data to analyze the layout. The character information extraction unit 103 separates the character portions from the blank space and illustration portions in the manuscript data, and extracts character information by performing character recognition processing on the character portions. The character information includes information such as that relating to breaks between blocks of words, phrases and clauses, in addition to information for specifying characters. The translation unit 104 translates the character information from the original language to a predetermined language by using dictionary data stored in the memory 11 or predetermined algorithms for example. The translation unit 104 stores new character information and a correlation between manuscript elements (phrases) before translating and after translating in the memory 11. The rearrangement unit 105 determines the position arrangement of the words that are translated, in accordance with the information obtained in the layout analysis unit 102. The supplementary information editing process unit 106 edits the supplementary information (such as changing the position or size of the rearranged supplementary information). Details of the supplementary information editing process will be described below. It should be noted that the functions of these units realized in the control unit 10 may be realized by individual independent processors, and may be realized by a single processor that executes multiple software, for example.

The memory 11 is a storage device such as RAM, ROM or hard disk that contains dictionary data and other reference data necessary when the control unit 10 performs the above-noted processes, in addition to the document data that is to be edited. Additionally, the memory 11 contains a table used when processing the supplementary information. The details of the table will be described when describing the supplementary information editing process.

The input unit 12 is a scanner, for example, and is a device for reading in manuscripts inscribed on paper, for example, as digital image data, and for supplying the data to the control unit 10. The operation unit 13 is an input device such as a keyboard or a mouse, for example, and is a device for the user of the document editing device 1 to input various directions relating to processing of the supplementary information, and for inputting other necessary information. The directions and information that are input are supplied to the control unit 10. The display unit 14 is constituted by a display device (not shown) such as a graphic processor (not shown) and a liquid crystal display, and it displays the document, or messages to the user, on the screen in accordance with directions from the control unit 10. The user performs the editing process, to be described below, by inputting various directions using the input unit 12 while observing the display screen of the display unit 14. The output unit 15 may be a printer for printing the manuscript on paper, for example, after supplementary information editing, a communication interface for supplying, to a printing apparatus, the document data obtained by performing the supplementary information editing process, or a storage device for storing the document data onto flash memory or a CD-ROM, for example.

Figure 1:
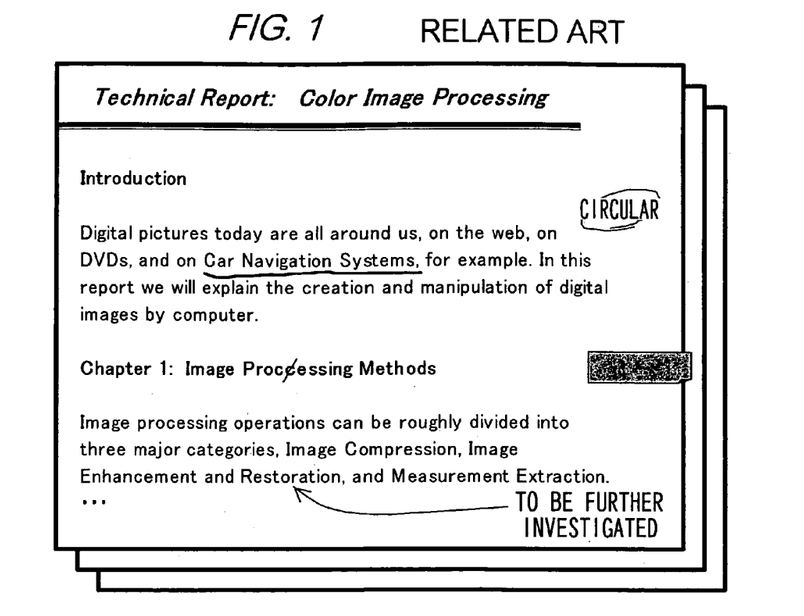
FIG. 1 is a diagram showing an example of a manuscript to which supplementary information is attached.
Figure 3:
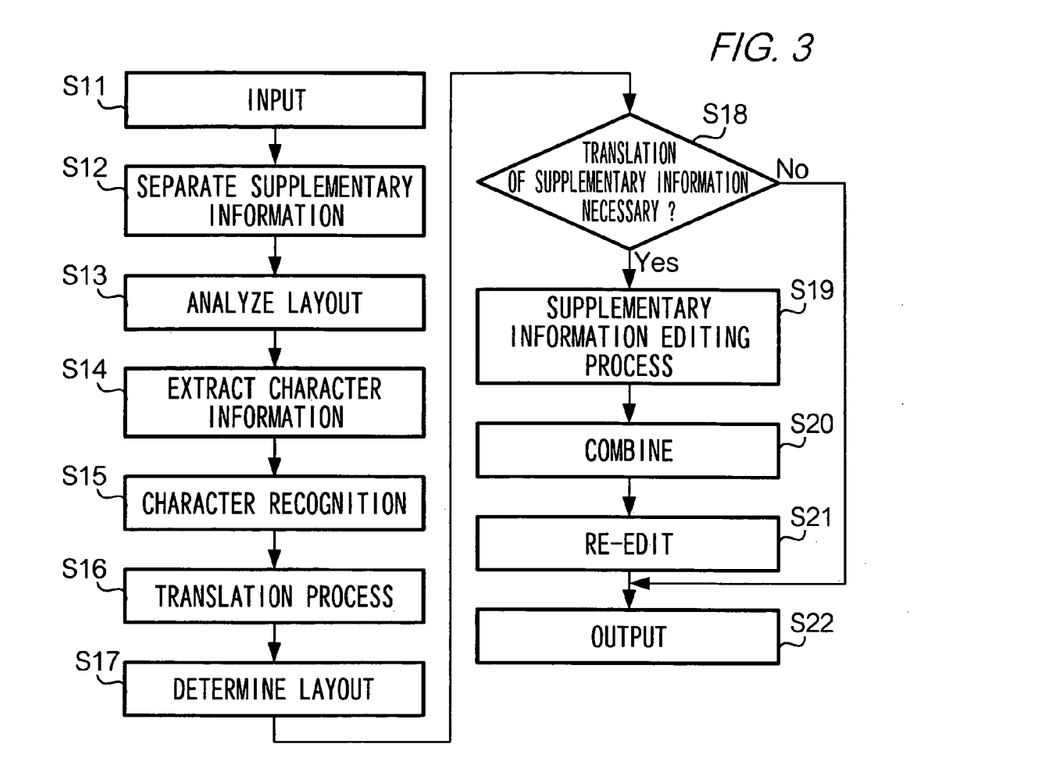
FIG. 3 is a flow diagram for explaining the process flow that is executed in the document editing device 1.

A case in which supplementary information of the manuscript shown in FIG. 1 is edited using the document editing device 1 will be described below. FIG. 3 is a diagram showing one example of a process executed in the document editing device 1. As shown in FIG. 3, firstly, when the user of the document editing device 1 sets the document that is to be the object of supplementary information editing on a scanner, and inputs a predetermined execution command, the content of the given document is read in, and document data is created (step S11). After this, in the control unit 10, the separating process unit 101 performs a predetermined analytical process on the given document data, and separates the document data into the manuscript data and the supplementary data (step S12). Next, the above noted layout analysis (step S13) and character information extraction (step S14) are performed on the manuscript data and the character information is extracted from the manuscript data (step S15). Then, the translation unit 104 translates the character information into a language specified by the user (step S16), and the rearrangement unit 105 determines the position arrangement and size of the translated manuscript portion and stores it in the memory 11 (step S17). When translation of the document is completed in this way, the control unit 10 displays a message on the display unit 14: "Supplementary information is included in the scanned document, in addition to the manuscript. Is the supplementary information necessary?" and requires the user to input directions (step S18). If directions are input to indicate that the supplementary information is not required (if step S18 is No), then the process proceeds to step S22 and the translated manuscript data is output. If a directive indicating that the supplementary data is required is input (if step S18 is Yes), then the process proceeds to step S19, and the supplementary information is edited. Details of this process are described using FIG. 4 to FIG. 6. It should be noted that if notes that may be translated are judged to be included in the supplementary information, then a message may be displayed: "The supplementary information includes notes. Translate notes?", and the control unit 10 may accept directions from the user. If it is determined that translation is necessary, then the control unit 10 translates the notes before executing the supplementary information editing process. "Supplementary information" mentioned below means supplementary information that has undergone any necessary translation.

Figure 4:
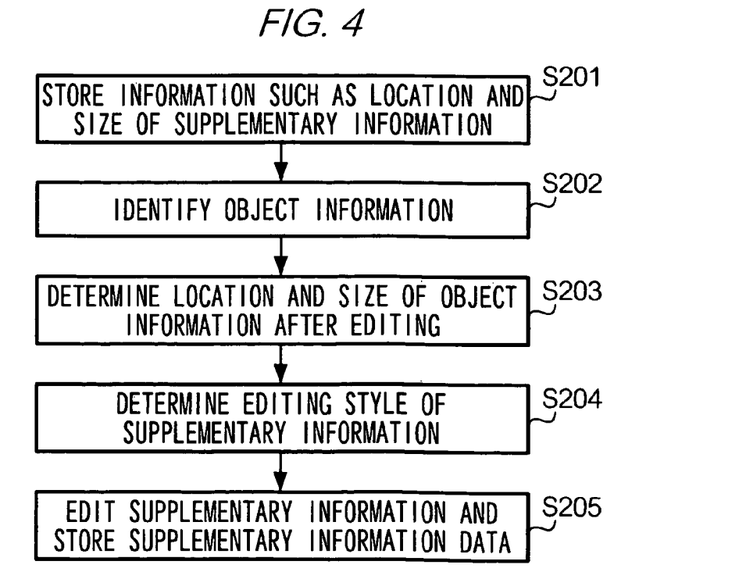
FIG. 4 is a diagram for explaining the flow of the supplementary information editing process.
Figure 5:
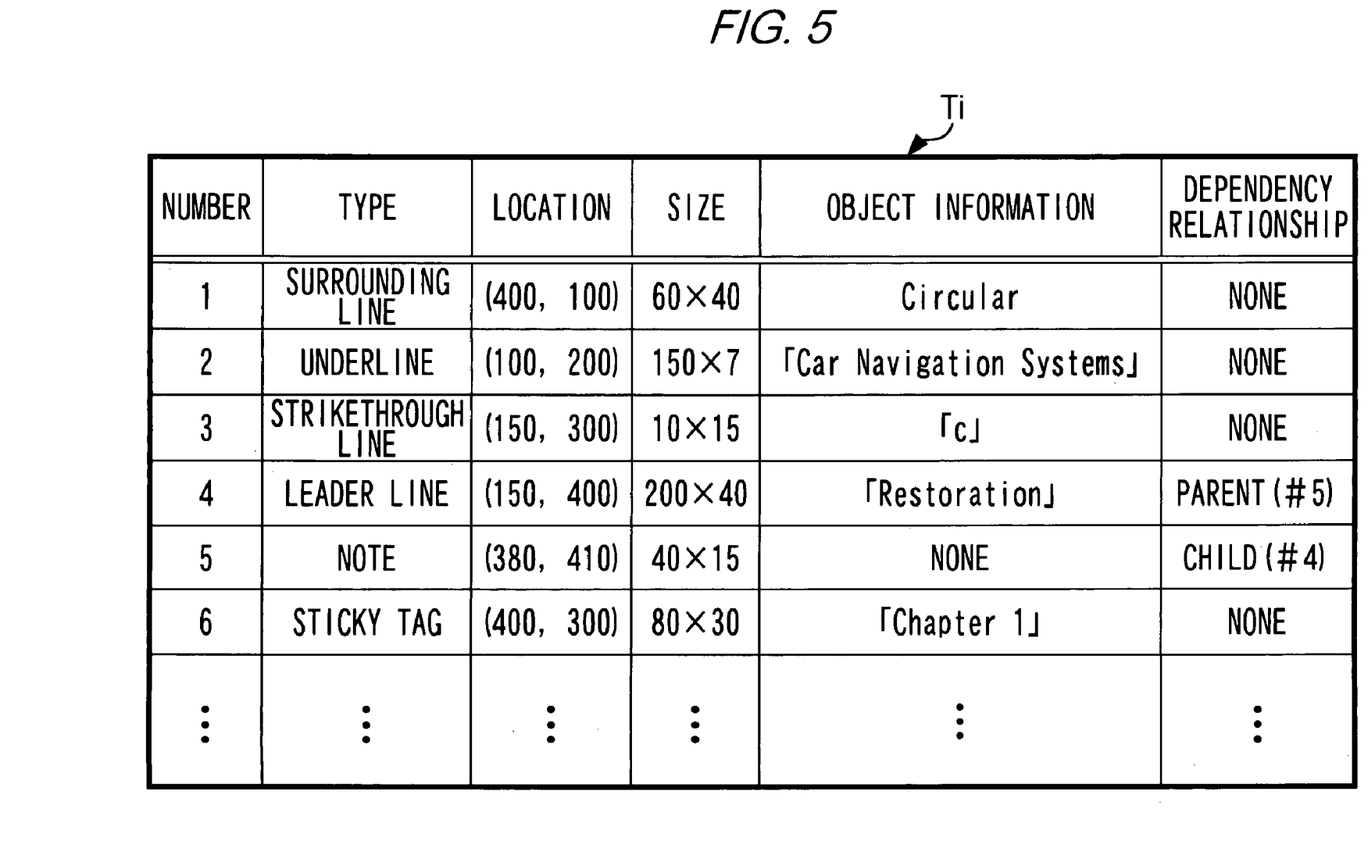
FIG. 5 is a diagram showing content of a supplementary information detail table Ti.

FIG. 4 is a diagram in which the details of the supplementary information editing process are described. First, in step S201, the information on the type, position and size, for example, of supplementary information (hereinafter referred to as "supplementary information detail") are stored. More specifically, the process proceeds to a step wherein consecutive numbers to each individual piece of supplementary information are attributed, and the supplementary information detail associated with these numbers in a supplementary information detail table Ti are stored in the memory 11. It should be noted that consideration is given to the shape of the supplementary information (such as whether it is a line, or an arrow, or the like) when determining the type of supplementary information, but the use of an algorithm for determining the type from information relating to the shape is optional. For example, the type may be determined by registering shapes and patterns of supplementary information in advance, and then judging their degree of similarity to the shape of the target supplementary information. As a result, values are stored in the "number", "type", "position" and "size" fields in the supplementary information detail table Ti as shown in FIG. 5. In FIG. 5, "number" refers to consecutive numbers for uniquely identifying the pieces of supplementary information, and "type" expresses the type of supplementary information. Here, "(100, 200)" in the "position" field corresponding to the supplementary information number "2" expresses the fact that the x-coordinate and y-coordinate of the position of the supplementary information (underline) in the image data is 100 pixels and 200 pixels respectively. The "size" being "(150, 7)" expresses the fact that the width of the supplementary information, in this case, underline, as an image object, is 150 pixels and the height is 7 pixels.

Next, it is determined that the relationship between the supplementary information and the manuscript or determines the relationship of the given supplementary information to other supplementary information using a predetermined method, based on the type, position and size of the supplementary information that were determined (step S202). For example, from the position and size of the underline, it is specified that the supplementary information (underline) of the supplementary information number "2" is drawn under the part of the manuscript that says "Car Navigation Systems". Thus, the relationship between each piece of supplementary information and the corresponding manuscript part (hereinafter referred to as "object information") is stored in an "object information" field in the supplementary information detail table Ti. In FIG. 5, the fields containing "none" express the fact that it has been determined that there is no direct relationship with that portion of the manuscript. Moreover, a relationship between the given supplementary information and other supplementary information is investigated. For example, the "note" of the supplementary information number "5" is determined to have a relationship with the "leader" of the supplementary information number "4" due to its position relationship. On the other hand, the "leader" of the supplementary information number "4" is determined to have a direct association with the word "Restoration" in the manuscript, and only the "note" is associated with the "leader". That is to say, it is possible to say that the "leader" is the "parent" on which the "note" depends, and conversely that the "note" is the "child" that depends on the "leader". The interrelationships between pieces of supplementary information are stored in this way in the "dependency relationship" field of the "supplementary information detail table Ti". In FIG. 5 "parent (#5)", for example, means that that supplementary information is information on which the supplementary information specified by the supplementary information number "5" depends.

Figure 6:
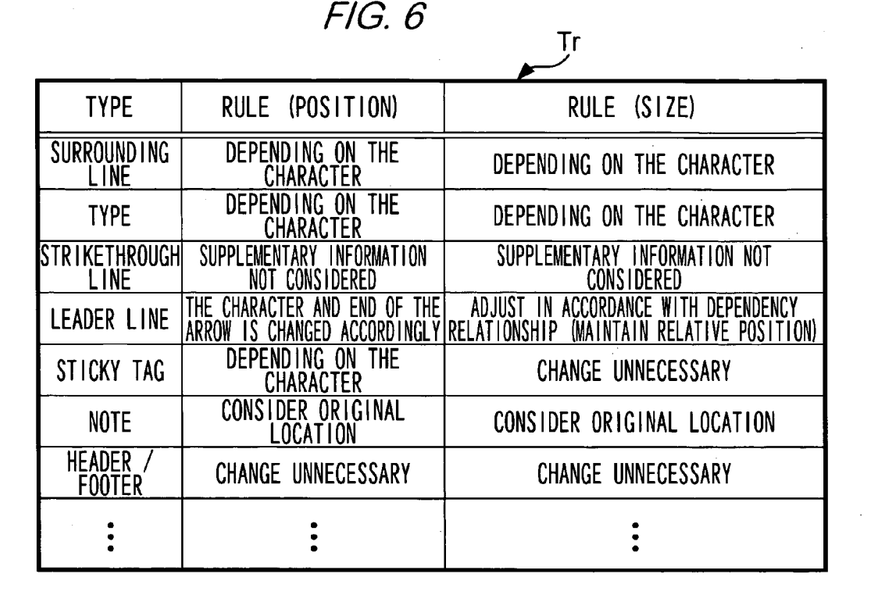
FIG. 6 is a diagram showing content of an editing style table Tr.

Returning to FIG. 4, in step S203, the position (and size, if necessary) of the translated object information that has been specified is read out from the memory 11. For example, for the phrase "Car Navigation Systems", which is object information, information on the position and size (font size) in the manuscript of the "カーナビゲーションシステム" (English translation: "Car Navigation System") after being translated and undergoing a predetermined layout change, is extracted. Then, in step S204, it is determined that the method for editing the supplementary information based on the position of the extracted object information, and the information stored in the editing style table Tr. FIG. 6 shows one example of content stored in the editing style table Tr. In FIG. 6, "type" expresses the type of supplementary information noted above. "Rule (position)" and "Rule (size)" respectively describe how to change the position and size of each piece of the supplementary information. Here, "with the characters" in the "Rule (position)" denotes a rule wherein if the position of the object information has changed due to the translation and layout changes, the position in which the supplementary information is attached will accordingly be changed. For example, if the object information is the phrase "Car Navigation Systems" and the supplementary information is "underline", an underline is drawn in the position of the phrase "カーナビゲーションシステム" (English translation: "Car Navigation Systems"), being the translated object information. More specifically, the supplementary information detail table Ti is referred to specify the object element of the given supplementary information ("Car Navigation Systems"). Then the phrase's translation "カーナビゲーションシステム" (English translation: "Car Navigation Systems") and its position arrangement is specified, based on information stored in the memory 11. It should be noted that if the translation is arranged in a position that straddles lines as a result of change in the layout of the manuscript during translation, a process will be performed to split the underline. Similarly, if the translation is arranged in a position that straddles to next page, necessary shape change processing, such as splitting, is also performed for position change.

Furthermore, in FIG. 6, "with the characters" for the "Rule (size)" denotes a rule, wherein if the size of the characters of the original language differs from the size of the characters of the language to which original language is to be translated, an underline that matches to the size of the characters of the language being translated is provided. For example, if the size of the characters becomes 1.5 times larger as a result of translation, an underline which is 1.5 times longer than the size of the corresponding underline in the original language is drawn under the specified translation. Furthermore, "do not process" for the column of "strikethrough lines" means that translating is performed whereby the word is confirmed to be the correct word after removing the character to which a strikethrough line has been attached, and to not attach a strikethrough line or other supplementary information to the translated word. Furthermore, "consider original position" for the "note" indicates a rule wherein, if a given piece of supplementary information was originally positioned in a blank space on the left side of the manuscript, the position of the supplementary information in the edited manuscript will also be positioned in a blank space on the left side. Furthermore, "adjust in accordance with dependency relationship (maintain relative position)" means that if other supplementary information is dependent, then the position or size of that supplementary information are determined by considering the position and size of that other supplementary information.

More specifically, firstly, other supplementary information that is dependent on a given piece of supplementary information (or supplementary information on which the given piece of supplementary information is dependant) in accordance with information stored in the "dependency relationship" field of the supplementary information detail table Ti is specified; secondly, the method for editing other supplementary information is determined by referring to the editing style table Tr; and finally, the position and size of the given supplementary information based on the determined editing style is determined. Even more specifically, in this example, since the "leader" is specified as "maintain relative position", the position and size is determined so as to maintain the distance between the given supplementary information supplementary information and the other supplementary information. For example, in the example shown in FIG. 6, the decision on the size of the "leader" is carried out after the decision on the position and size of the "note".

The reason for considering the relationship between various pieces of supplementary information is that, as a result of translation, it becomes necessary to move a leading line and a note of a text on account of changes in the object information in the edited text. However, if the dependency relationship between various pieces of supplementary information is not considered and the size and the position of the leading line and note are separately and independently determined, the result is that the foot-note will not be positioned in a blank space, or the leading line and the note become overlaid. To avoid such a situation, it is necessary to determine a method which is appropriate for editing various pieces of supplementary information so as to maintain the formatting rules of the original text as described above. If the editing style for all the supplementary information is determined in this way, then the supplementary information data is edited in accordance with the editing styles that were determined, and the data are stored in the memory 11 (step S205).

Figure 7:
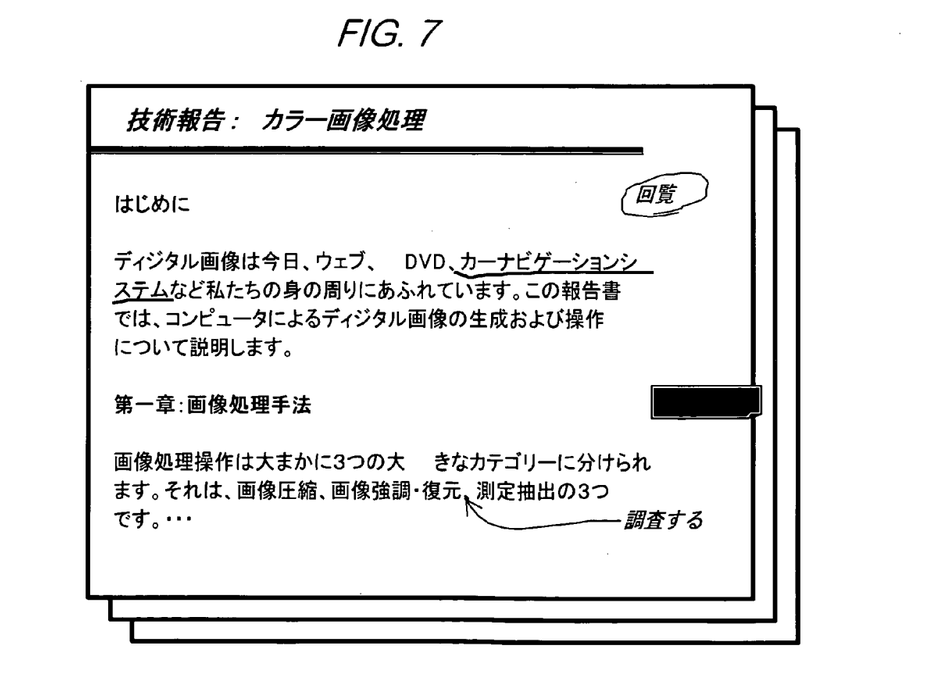
FIG. 7 is a diagram showing an example of a manuscript after the supplementary information editing process.

Returning again to FIG. 3, when the supplementary information data that is edited is stored, the translated manuscript data is read out, and the data of the supplementary information after editing, from the memory 11, and combines the manuscript data and the supplementary data (step S20). The process proceeds to a step wherein result of the synthesis is displayed on the display unit 14, as well as a message: "Please confirm editing result", and requests the user to confirm the content of the editing result. FIG. 7 shows an example of a document obtained by performing the above-noted process on the document shown in FIG. 1 (manuscript with attached supplementary information). As can be seen by comparing FIG. 1 and FIG. 7, as a result of changing the position and length of the line (and, in this case, processing to split the line) under the "Car Navigation Systems" portion of the original manuscript, the underline is arranged under the portion corresponding to "カーナビゲーションシステム" (English translation: "Car Navigation Systems") in the translated manuscript. For the arrow and the note "to be further investigated" associated with "Restoration", the position and length of the arrow are changed, and the position of the note is changed. As a result, it can be seen that the arrow and the note are located in the expected position in the translated manuscript.

If the user is not satisfied with the content of the editing process, then he may edit the supplementary information by a predetermined method (step S21). More specifically, if the note is not arranged in a desired position, the user uses a tool such as a mouse, to specify the note and the new position of the note. In this way, in the present step, if the supplementary information is not processed in a way that the user desires, or if it is judged that the positional arrangement or size of the supplementary information needs to be further adjusted, a user may re-edit each piece of supplementary information accordingly. Following to step S21 and other process, if a predetermined confirmation instruction is input by the user, the process proceeds to a step wherein the editing content of the manuscript and the supplementary information is set, and the processed document is output (step S22).

When a manuscript and various types of supplementary information are included in a document, with the present embodiment, even in a case wherein such as the position or size of the object information in the manuscript is changed due to translation or editing process, the position or size of the supplementary information can be suitably edited without placing a burden for the user.

Modified Embodiment

In the above-noted embodiment, a case in which the position or size of supplementary information is changed in accordance with changes in the position or size of object information when translating a manuscript has been taken as an example and described, however it is also possible to similarly apply the present invention to a case in which the position or size of the manuscript is changed due to simple font size changes or layout changes (such as changes in line number, characters per line, blank space, and column arrangement), without limitation to translation processing. In other words, provided that the correlation between the object information before editing, and the object information after editing can be known, the editing process performed on the manuscript may be any type desired.

It should be noted that the types of supplementary information to be edited are not limited to those described above.

Furthermore, any desired algorithm may be used to discriminate the supplementary information. That is to say, it is sufficient that the algorithm is capable of differentiating between manuscript data (or images). Furthermore, for the method for editing the supplementary information, this may also be a method for editing shape, for example, without limitation to position or size. In a case in which the shape of the supplementary information is changed, if the supplementary information is an arrow, for example, then it is also possible to leave the size of the end portion of the arrow (arrow head portion) unchanged in order to ensure visibility for the user, and to change the thickness or length of the line portion, rather than making the size smaller and maintaining the shape, for example. Or, if the supplementary information is an underline, then it is also possible to change the underline to a broken line. That is to say, information relating to the supplementary information to be edited (such as the type of supplementary information) and the elements that are the object of the editing (such as position and size), are stored in the supplementary information detail table Ti and the editing style table Tr, and it is sufficient that the supplementary information that is to be edited, and the editing style, are specified uniquely.

The editing style when multiple pieces of supplementary information have dependency relationships may be determined as desired. For example, if multiple notes and arrows are mutually and intricately intertwined, which method for editing the supplementary information (note or arrow) is determined first may be determined at the user's discretion. Or, the notes and the arrows may be treated together as a single piece of supplementary information, rather than treating them as separate objects to be edited (that is to say, supplementary information). For example, if there is a note within a predetermined range around the ends of a leader, then the leader and the note may be treated as a single piece of supplementary information.

Furthermore, in the embodiment noted above, a paper document is scanned, after which the manuscript data and the supplementary information data are separated; however, the methods for editing supplementary information according to embodiments of the present invention, may be applied to document data that has been created in a form in which the manuscript data and the supplementary information data are separated.

In order to address these issues, the present invention provides a document editing device the device including: a editing unit that edits an manuscript element of a document; and a supplementary information editing unit that edits the supplementary information of the document based on a result of editing the manuscript element by the editing unit, wherein the document is a electronic document read by a reading device. With the device of the present invention, if the manuscript and various types of supplementary information are included in the document, then even if the position and size, for example, of the manuscript elements are changed during the editing, it is possible to appropriately change the position and size, for example, of the supplementary information in accordance with those changes.

According to an aspect of the present invention, the supplementary information is attached to the manuscript element by a user. In another favorable aspect of the present invention, the editing process is a translation process. In another favorable aspect of the present invention, the document has the manuscript element and the supplementary information, and the manuscript element has at least one of a character, a letter, a picture and a illustration, and the supplementary information has at least one of a underline, a line, an arrow, a note, a tag and an annotation provided on the document and related to the manuscript element. In another favorable aspect of the present invention, the supplementary information is edited based on type or position information of the manuscript information and/or the supplementary information.

According to another aspect, the present invention provides a document editing method, the method including: editing a manuscript element of a document; and editing supplementary information of the document based on a result of editing the manuscript element, wherein the document is a electronic document read by a reading device.

According to another aspect, the present invention provides a storage medium readable by a computer, the storage medium storing a program of instructions executable by the computer to perform a function for editing a document, the function including: editing a manuscript element of the document; and editing supplementary information of the document based on a result of editing the manuscript element, wherein the document is a electronic document read by a reading device.

The foregoing description of the embodiments of the present invention has been provided for the purposes of illustration and description. It is not intended to be exhaustive or to limit the invention to the precise forms disclosed. Obviously, many modifications and variations will be apparent to practitioners skilled in the art. The embodiments are chosen and described in order to best explain the principles of the invention and its practical applications, thereby enabling others skilled in the art to understand the invention for various embodiments, and with the various modifications as are suited to the particular use contemplated. It is intended that the scope of the invention be defined by the following claims and their equivalents.

The entire disclosure of Japanese Patent Application No. 2005-90201 filed on Mar. 25, 2005 including specification, claims, drawings and abstract is incorporated herein by reference in its entirety.

What is claimed is:

1. A document editing device comprising:
    an inputting unit for inputting document data from a physical document, the physical document having at least one of a manuscript element and supplementary information;
    a manuscript editing unit that edits the manuscript element of the document data; and
    a supplementary information editing unit that edits the supplementary information of the document data based on a result of editing the manuscript element by the manuscript editing unit, the supplementary information including at least one of a handwritten line, a handwritten arrow, a handwritten note, a handwritten tag, and a handwritten annotation provided on the document data and related to the manuscript element,
    wherein when a property of the manuscript element is changed, an attribute corresponding to the appearance of the supplementary information near the manuscript element is changed to correspond to the change of the property of the manuscript element.

2. The document editing device according to claim 1, wherein the supplementary information is attached to the manuscript element by a user.

3. The document editing device according to claim 1, wherein the manuscript editing process includes a translation process.

4. The document editing device according to claim 1, wherein the document data has the manuscript element and the supplementary information, and the manuscript element has at least one of a character, a letter, a picture and an illustration.

5. The document editing device according to claim 1, wherein the supplementary information is edited based on type or position information of the manuscript information and/or the supplementary information.

6. A document editing method comprising:
    inputting document data from a physical document, the physical document having at least one of a manuscript element and supplementary information;
    editing the manuscript element of the document data; and
    editing the supplementary information of the document data based on a result of editing the manuscript element, the supplementary information including at least one of a handwritten line, a handwritten arrow, a handwritten note, a handwritten tag, and a handwritten annotation provided on the document data and related to the manuscript element,
    wherein when a property of the manuscript element is changed, an attribute corresponding to the appearance of the supplementary information near the manuscript element is changed to correspond to the change of the property of the manuscript element.

7. The document editing method according to claim 6, wherein the supplementary information is attached to the manuscript element by a user.

8. The document editing method according to claim 6, wherein the manuscript editing process includes a translation process.

9. The document editing method according to claim 6, wherein the document data has the manuscript element and the supplementary information, and the manuscript element has at least one of a character, a letter, a picture and an illustration.

10. The document editing method according to claim 6, wherein the supplementary information is edited based on type or position information of the manuscript information and/or the supplementary information.

11. A storage medium readable by a computer, the storage medium storing a program of instructions executable by the computer to perform a function for editing a physical document, the function comprising:
    inputting document data from a physical document, the physical document having at least one of a manuscript element and supplementary information;
    editing the manuscript element of the document data; and
    editing supplementary information of the document data based on a result of editing the manuscript element, the supplementary information including at least one of a handwritten line, a handwritten arrow, a handwritten note, a handwritten tag, and a handwritten annotation provided on the document data and related to the manuscript element,
    wherein when a property of the manuscript element is changed, an attribute corresponding to the appearance of the supplementary information near the manuscript element is changed to correspond to the change of the property of the manuscript element.

12. The storage medium according to claim 11, wherein the supplementary information is attached to the manuscript element by a user.

13. The storage medium according to claim 11, wherein the manuscript editing process includes a translation process.

14. The storage medium according to claim 11, wherein the document data has the manuscript element and the supplementary information, and the manuscript element has at least one of a character, a letter, a picture and an illustration.

15. The storage medium according to claim 11, wherein the supplementary information is edited based on type or position information of the manuscript information and/or the supplementary information.

16. A document editing method, the method comprising:
storing in a table an editing method for supplementary information including rule about position and size in correspondence with a type of the supplementary information;
inputting a piece of document data;
for each piece of supplementary information included in the document data inputted in the inputting step, identifying, object data that indicates at least one of either a manuscript element or another piece of supplementary information, each piece of supplementary information including at least one of a handwritten line, a handwritten arrow, and a handwritten note the manuscript element may represent a connection of a piece of supplementary information to either a manuscript element, a manuscript element and another piece of supplementary information, or another piece of supplementary information;
editing manuscript data included in the document data in a predetermined manner, and storing a correlation between the manuscript elements before editing and after editing;
for each piece of the supplementary information, determining an editing method for the each piece of supplementary information, based on at least the type of the supplementary information identified in the identifying step, the manuscript element and other piece of supplementary information specified by the object information related to the each piece of supplementary information, and the editing method stored in the table; and
editing each piece of the supplementary information according to the editing method determined in the determining step, and combining the edited supplementary information with the manuscript data that was edited in the step of editing manuscript data.

17. The document editing method according to claim 16, wherein the editing performed on the manuscript data in the step of editing manuscript data is translation process.

18. The document editing method according to claim 16, wherein in the identifying step, the object information related to the supplementary information is determined, based on at least the type and position of the supplementary information.

19. A document editing device comprising:
storing means for storing a table describing a method for editing supplementary information including rule about position and size in correspondence with a type of the supplementary information;
inputting means for inputting a piece of document data;
for each piece of supplementary information included in the document data inputted in the inputting means, identifying means for identifying, object data indicating at least one of either a manuscript element or another piece of supplementary information, the each piece of supplementary information including at least one of a handwritten line, a handwritten arrow, and a handwritten note the manuscript element may represent a connection of a piece of supplementary information to either a manuscript element, a manuscript element and another piece of supplementary information or another piece of supplementary information;
manuscript editing means for performing predetermined editing on manuscript data included in the document data, and that stores a correlation between the manuscript elements before editing and after editing;
for each piece of the supplementary information, determining means for determining an editing method for the each piece of supplementary information, based on at least the type of the supplementary information identified by the identifying means, the manuscript element and other piece of supplementary information specified by the object information related to the each piece of supplementary information, and the editing method stored in the table; and
supplementary information editing means for editing each piece of the supplementary information according to the editing method determined in the determining means, and that combines the edited supplementary information with the manuscript data edited by the manuscript editing means.

* * * * *